Jan. 7, 1947.                A. R. STONE                2,413,797
                          FASTENING DEVICE
                        Filed April 16, 1945
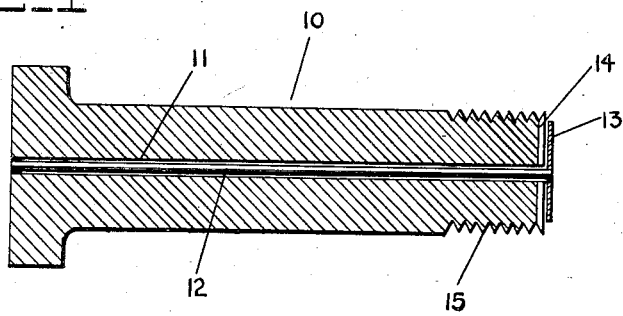
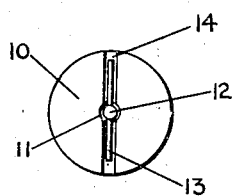
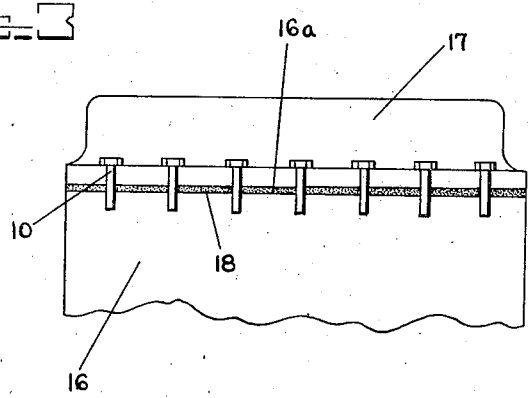
ALBERT RIVINGTON STONE   INVENTOR.
BY
HIS ATTORNEY Patented Jan. 7, 1947

2,413,797

UNITED STATES PATENT OFFICE 2,413,797

FASTENING DEVICE

Albert Rivington Stone, Anneslie, Md., assignor to Gerotor May Corporation, a corporation of Maryland Application April 16, 1945, Serial No. 588,650

5 Claims. (Cl. 85—1)

My invention relates generally to bolts, studs, and like fastening devices and more particularly, it concerns a method and means for determining the degree of tightness of the same so as to impress exactly determined stresses thereupon.

An important object of my invention is to provide a method of tightening a bolt, stud or the like to a desired degree, which method is inherently simple, rapid and easy to carry into effect, requiring an operator of only moderate skill and which at the same time is highly precise and accurate in final results.

Another object is to provide a bolt, stud, or the like, so designed that accurately predetermined elongation thereof and consequently a predetermined stress, can be achieved at a minimum, both of complexity of design and of first cost, and in rapid, simple and accurate manner and with the use of only standard equipment handled by an operator of but average skill, the desired objective being achieved without appreciable weakening of the bolt or the like under applied stresses regardless of type, and without appreciable increases of the strains set up in the bolt either during the tightening operation or in subsequent use.

Other objects will in part be obvious and in part pointed out hereinafter during the course of the following description, considered in the light of the accompanying drawing.

My invention accordingly resides in the combination of elements, and features of construction, and arrangement of parts as well as in the several operational steps and the relation of each of the same to one or more of the others, the scope of the application of all of which is more fully developed in the claims at the end of this specification.

In the drawing, wherein I disclose one embodiment of my invention which I prefer at present:

Figure 1 constitutes a longitudinal section through a bolt embodying my invention;

Figure 2 is an end view of the same bolt, taken at the right-hand end of Figure 1; while Figure 3 constitutes an elevation showing the relation of the tightening nut to the bolt, the related parts of a typical installation being illustrated in phantom disclosure.

Like reference characters denote like parts throughout the several views.

As conducive to a more thorough understanding of my invention, it may be noted that a problem has existed of properly tightening down the related parts of pressure-resisting appliances. Where the tightening operation was incompletely performed, leakages were observed and system performance would fall off. Efficiencies were low. Where tightening was uneven from bolt to bolt or stud to stud, some of the bolts or studs being tighter than others, some elements would carry a disproportionate part of the bursting stresses or similar loads, while other elements would be underloaded. Moreover, and somewhat more important, stresses would be imposed upon, and strains would be developed within, the structural parts secured by the bolts or studs. These stresses, unpredictable in character and distribution, would tend toward warping or twisting within the structural parts.

Perhaps one of the most important fields of light-weight, high-strength, fastening devices which must be stressed approaching the limit of the metal is in high-speed internal-combustion engines, especially in reciprocating parts such as connecting rods. Equal and balanced stresses are required in fastening together each connecting-rod bearing. To have one side of the bearing tight and the other loose, even to a slight extent, would not be satisfactory; it would be fatal to the motor.

In these instances, which are cited as merely typical, as well as in many other fields of activity to which no specific reference has herein been made, precision tightening of bolts and studs represents a primary requirement.

An important objective of my invention, therefore, is to avoid in substantial measure the several disadvantages and defects as hereinbefore set forth, and at the same time, to provide bolts, studs and like fastening devices in which the required and desirable qualities are strikingly displayed of simplicity, reliability, and accurately reproducible results, together with uniform and even tightening throughout any particular application, all this being accompanied by the application of uniform, predictable, and desired stresses to the structural parts undergoing bolting together and permissible strains in the bolts themselves.

Referring now more particularly to the practice of my invention, and having reference to the drawing, a bolt or stud following the teachings of my invention comprises an elongated body member 10 (Figure 1) which is longitudinally, and in the preferred instance, axially bored as at 11. It is entirely feasible to dispose the bore 11 assymetrically relative to the center line through the bolt. For purposes of greatest possible strength, however, I provide this bore in the preferred instance, along the axis of the bolt.

This minimizes any weakening to sheer, torsion, tension, compression or other static or dynamic stresses. To ensure maximum strength, I make this bore of extremely small diameter, so that the least possible quantity of metal will require removal. This bore may be drilled, bored, reamed, cast or pierced in initial fabrication, or otherwise formed in suitable manner in the bolts or studs. I have shown the bore 11 as extending completely through the bolt 10. It is entirely feasible, however, to terminate one end of the bore, say the left end in Figure 1, short of the length of the bolt, so that the bore dead-ends therein.

Within the bore 11 I provide a gauge rod 12 which extends the full length of the bore and which is made fast at one end thereof. In this present embodiment, the gauge 12 is depicted as made fast, at the left end in Figure 1, of the bolt 10 at the bolt head or top of said bore 11. It will be understood, however, that in many applications the gauge rod is made fast to the bottom or end of the bolt. The only requirement to be observed in dimensioning the gauge rod 12 relative to the bore 11 is to insure that this rod is free to move therein, and relative to the walls thereof, without binding thereagainst. Free slip is essential, so that stressing of the bolt is not transmitted to the gauge.

An important feature of my new fastening device is that the rod 12 is of nicely calibrated distance beyond the outer face of the bolt, once the gauge 12 is positioned in bore 11 and made fast to the bolt 10. The amount of this nicely determined projection or overhang is a measure of the elongation of the bolt which is sought. In the subsequent tightening operation, once the nut or other similar fastening means is threaded or otherwise secured down on the bolt 10 an extent sufficient to elongate the latter so that its free end (the right-hand end in Figure 1) is flush with the outer end of the rod 12, the operator will know that the bolt 10 has been elongated to just the proper extent, and that it has been tensioned to the proper stress.

To facilitate the foregoing, I have found it convenient in many instances to provide an enlarged and elongated head at the right or free end of the gauge 12. Such head is indicated at 13 in Figures 1 and 2. It will of course be apparent that when the free end of the gauge rod 12 terminates simply in what may conveniently be termed a point, some difficulty might be encountered in gauging, by the naked eye, the point where the edge of the bolt 10 comes flush with the corresponding end of gauge rod 12. Error quite likely may creep in. Such possibility of error is effectively avoided, however, when the enlarged and elongated head 13 is provided at the free end of the rod 12. A substantial surface, evidenced by a line as distinguished from the point which is viewed when the uncapped gauge rod is employed, is provided for facilitating the gauging operation. The operator can much more readily sight the edge of the rod 10 against the sighting means 13. He can determine readily and accurately exactly when the two surfaces are flush with each other.

A complementary shape is imparted to the corresponding end of the bolt 10. To this end, a groove or channel 14 is recessed across the outer end of the stud or bolt 10. This groove 14 serves as a sort of sheath for the head 13, and permits the latter to collapse within the confines of the stud 10 as the latter is elongated to encompass the head 13. The depth of the channel 14 need be only sufficient to receive the full depth of the end 13 when the bolt 14 is tensioned to the proper extent.

Even this enlarged head on the end of the rod 12 may be improved upon providing an index line thereacross coinciding with similar index lines provided on the margins of the free end of the bolt 10. Registry of these lines, readily subject to visualization by the operator, determine the torsional deformation imparted to the bolt 10 by tightening. This line therefore may be said to serve as a measure of the torsional stress. Where desired, it will be understood that the index line on rod 12 and that on the end of bolt 10 may be made in initial registry so that upon tightening the bolt they will be brought out of register. Such a modification permits direct indication of the torsional deformation and the torsional stress to which the bolt is subjected.

I provide threads 15 about the periphery of the right end of the bolt 10 for cooperating with a suitable nut, not shown, for tightening down against the bolt 10 and for elongating the latter through tension stresses. This nut is simply a conventional illustration of any one or more of a number of other suitable and conventional tensioning means, themselves well-known in the art and not per se forming any part of this invention. The characteristic of all such lock-down means is that simply conventional wrenches, spanners, and the like, are required in turning the lock-down means. Such wrenches may be either power-energized or hand-operated.

During the tightening process, the bolt or stud is elongated to an extent such that its end will be flush with the corresponding free end of the gauge rod. When this condition is achieved, the operator knows at once that the bolt has been tightened to an accurately predetermined extent. The bolts or studs simple in basic design, can be produced in ready and inexpensive manner in quantity production at the factory. No special tools are required for tightening down the nut or other clamping means; no skilled operation or attendance is required during the tightening steps. Within an hour or so, a plant worker can be thoroughly schooled in the proper manipulation of simple and ordinary wrenches or other tightening means so as to effectively carry out the operation according to my invention.

To demonstrate more fully the application of my invention, let us consider for a moment a particular problem. It is recognized that the modulus of elasticity of steel in tension is 30,000,000 pounds per square inch. Assume, for illustration, that the bolt is constructed of a steel having a minimum yield point of 100,000 pounds per square inch. It is desirable, to insure proper tensioning without however attendant danger of flow of the metal of the bolt or permanent set therein, that the bolt be tightened to such an extent that stresses are set up therein amounting to no more than 80% of this minimum yield point, or 80,000 pounds per square inch. The elongation per inch of length of the bolt which will correspond to the foregoing stress per square inch is readily seen to be $80,000 \div 30,000,000 = 0.0026$ inch per inch of bolt length. Similarly, for every 10,000 pounds per square inch stress the elongation corresponding thereto would be $10,000 \div 30,000,000$ or $0.00033$ inch per inch of bolt length. Finally, for a stress of approximately 90,000 pounds per square inch, which is so frequently used in practice, a stretch of approximately 0.003 inch per inch of bolt length is employed. Where a two-inch stud is used, a stretch of 0.006 inch is sought, and the outer edge of the enlarged head 13 of the gauge 12 (Figure 1) would be made to extend 0.006 inch beyond the edge of the untensioned bolt 10.

Considering a specific application of my invention to a particular problem, attention is directed to Figure 3 wherein there is shown by way of illustration, the conventional cylinder block of an internal combustion engine, indicated in phantom outline at 16, the cylinder head being similarly illustrated at 17. Studs 10 project upwardly from the upper surface 16a of the motor block 16, near the periphery thereof. The usual cylinder head gasket 18 is interposed between the cylinder block 16 and the cylinder head 17.

It is highly important that the sealing head be clamped down against the cylinder block with uniform pressure throughout its peripheral extent. This is essential in order to provide proper seal between these two elements and to cause effective seal by the gasket between the myriad ports comprising the passages cast, drilled, or otherwise formed in the working faces of these two elements; to prevent blow-over from the water channels into the cylinders or from one cylinder to another; and as well, to protect the gasket itself. Heretofore, up until comparatively recent years this could be accomplished only partially, and then only by rotating each nut a predetermined number of turns. Any unevenness or irregularity in the threads, either of the bolt or the corresponding nut or other clamping means would detrimentally affect this operation. Recently torsion wrenches, so called because metering means are provided therein for indicating the force which the operator has to exert, also have been used for this purpose, but here again any unevenness in the threads of the bolt or stud results in lack of uniformity.

According to the practice of my invention complicated, delicate and special tools of this general nature, necessarily involving a substantial expenditure, are avoided. According to my invention, the nuts can be tightened down on the bolts 10 simply by visual inspection, with the application of just the required and predetermined tension. The measure of tension is the elongation of the studs themselves. In this manner, the cylinder head is firmly and uniformly secured throughout its extent against the cylinder block. The stresses and the strains are uniformly distributed upon and through the cylinder head gasket, and effective seal is assured throughout the useful life of the gasket. Moreover, the life of this gasket is prolonged due to the uniform loading and absence of local overload. This of course constitutes simply a typical illustration of many varied applications to which my new invention may be put.

It is readily apparent from the foregoing that in entirely simple and practical manner, I provide a method of tightening bolts, studs, and the like accurately to exactly predetermined stresses, in rapid, ready, economical and highly efficient manner. Rapid visual determination of the proper elongation of the bolts or studs is readily achieved. The bolts themselves employed in the technique according to my invention, including the associated gauges which comprise a permanent part of my new studs, are simple of production, possess a resistance against practically all stressing, which is substantially unimpaired as a result of the processing according to my teaching, and lend themselves readily to tightening according to my new methods in simple, rapid, and expeditious manner with comparatively unskilled labor, and with the use of ordinary, conventional and available tools. All these and many other highly practical results are achieved according to the practice of my invention.

While, as illustrative of the practice of my invention I refer to bolt, stud and the like it will be understood that I contemplate all fastening devices in which a predetermined strain is to be established. Also, while it is indicated that the gauge rod is so constructed as to initially project beyond the end of the bolt or stud with which it is associated, I also contemplate a construction wherein the rod is initially made flush with the end of the bolt or stud and the degree of stress to which the bolt or stud is subject is determined by the stretch of the same beyond the gauge end. Measurement of this may be had by micrometer or by feeler gauge. This embodiment is particularly suited to applications where the stress at which the bolts or studs are to be subjected is not known at the time of their production. It will be noted, however, that direct indication of the stress desired may be ascertained in cases where only the one end of the bolt or stud is accessible.

It will be readily understood from the foregoing that many embodiments of my invention will occur to those skilled in the art once the broad aspects of my new technique are disclosed. It is equally apparent that many modifications may be evolved of that embodiment which I have disclosed. Accordingly, I intend that the foregoing description be construed as merely illustrative, and not by way of limitation.

I claim as my invention:

1. A bolt or stud susceptible of precise and predetermined elongation comprising a body member having an axial bore therethrough and a threaded end portion, a rod disposed through said bore and fast at one end thereof to a corresponding end of said bolt or stud and extending with its other end a predetermined distance beyond the other end of said body member to permit the gauge end to become flush with the end of the bolt or stud with the desired elongation of said bolt or the same.

2. A bolt or stud capable of being tightened to an exactly predetermined stress, comprising a body member having a longitudinal bore extending at least partly therethrough, and a gauge rod extending through said bore and made fast at one end thereof to the dead end of said bore, said gauge member extending at its free end a predetermined extent beyond the end of said bolt or stud whereby tightening of the same permits elongation of the latter to an extent determined by the protrusion of said gauge rod.

3. A bolt or stud capable of being tensioned to an exactly predetermined value, comprising a body member having a bore extending longitudinally through at least a portion of its extent, and a gauge rod extending through said bore and fast to the body member at the dead end of said bore, said gauge rod terminating at its outer end in an index, and the free end of the bolt or stud being provided with a complementary index to permit direct indication of the torsional stress applied to said body member.

4. A bolt or stud capable of being stressed to a predetermined value, comprising a body member having a longitudinal bore extending therethrough, and a gauge rod extending through said bore and fast at one end to the dead end of the bore and projecting outwardly at its free end in an enlarged head beyond the end of the bolt or stud to a predetermined extent, said body member having a recess or channel extending partly across the end thereof and complementary to and with a depth sufficient to receive the elongated head of the gauge rod and the outer surface of the elongated head and the edge of the bolt or stud having complemental scorings to facilitate visual alignment of the bolt or stud against the elongated head as the former is subjected to torsional deformation during tightening.

5. A bolt or stud capable of being tightened to an exactly predetermined value, comprising a body member having a bore extending longitudinally from one end thereof through at least a portion of its extent, and a gauge rod within said bore made fast at one end thereof and free at the other end, the free end of said gauge rod extending adjacent the open end of said bolt or stud whereby tightening of the bolt or stud stretches the same a measured amount as determined by the movement of the open end of the bolt or stud with respect to the free end of the gauge rod.

ALBERT RIVINGTON STONE.